G. T. LEWIS & E. O. BARTLETT.
Process of Refining Lead Fumes.
No. 223,931. Patented Jan. 27, 1880.
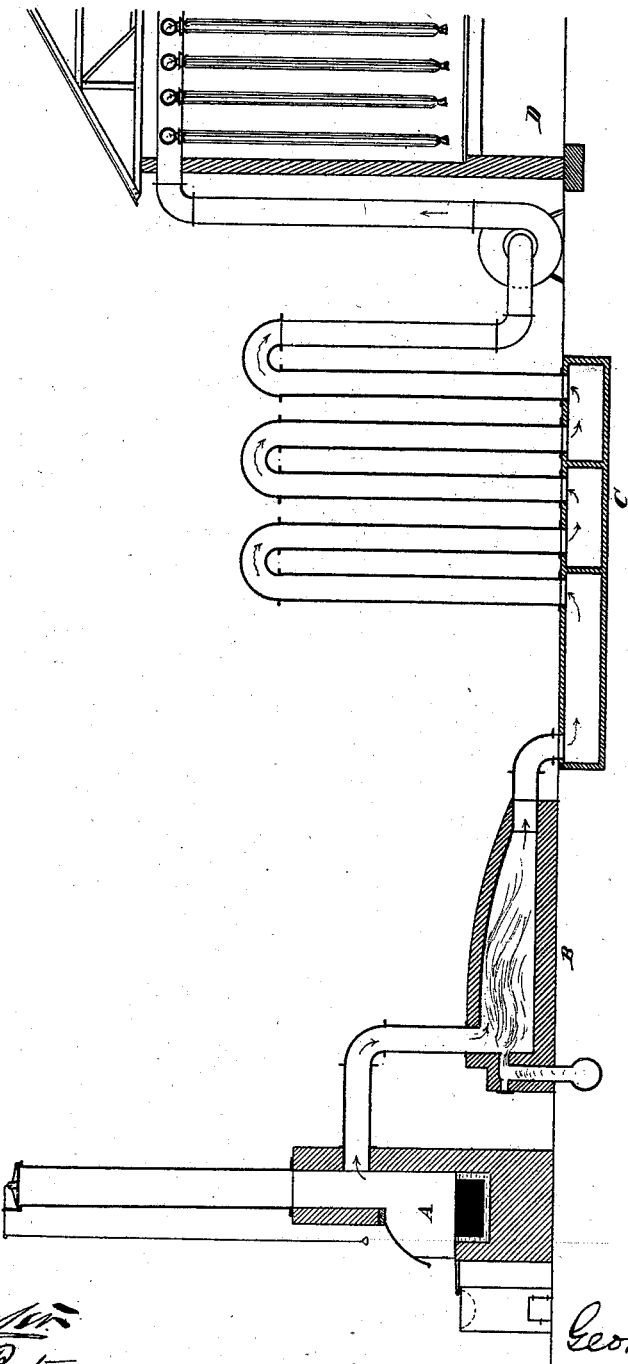

UNITED STATES PATENT OFFICE.

REISSUED

GEORGE T. LEWIS, OF PHILADELPHIA, PENNSYLVANIA, AND EAYRE O. BARTLETT, OF PEMBERTON, NEW JERSEY.

PROCESS OF REFINING LEAD-FUMES.

SPECIFICATION forming part of Letters Patent No. 223,931, dated January 27, 1880.

Application filed November 6, 1879.

*To all whom it may concern:*

Be it known that we, GEORGE T. LEWIS, of Philadelphia, Pennsylvania, and EAYRE O. BARTLETT, of Pemberton, New Jersey, have invented new and useful Improvements in the Manufacture of White-Lead Pigments, of which the following is a specification.

Our improvement relates to the manufacture of a white-lead pigment from lead ores or from waste lead-fumes from lead smelting or refining.

Heretofore white-lead pigments have been manufactured from galena or other lead ores in raw or roasted state by subjecting them to the joint action of heat and air, either with or without reducing means, according to the quality of the lead ores used; or it has been manufactured from waste lead-fumes from lead smelting and refining by passing them through externally-heated tubes, retorts, or muffles (for which application is pending in the name of Geo. T. Lewis) before catching the fumes, or by reburning the crude fumes after first collecting them in bags or screens of textile fabric, and then again collecting the refined lead-fumes, for which applications are also pending in the name of Geo. T. Lewis and E. O. Bartlett.

By these processes the refined fumes are discolored by particles of carbon or sulphuret of lead, or both, if the greatest care is not taken in keeping a bright fire in the furnace and in the selection of the fuel. In the case of waste fumes these are nearly always gray, and sometimes almost black. We have found that by passing these fumes, after leaving the furnace where they are formed, over a bright and clear fire, or by passing them through a furnace in which generated gas is burned, the dark and black particles are all burned out and the fumes are refined, and after passing through the cooling-pipes they can be caught in the bags of textile fabric, and will be in the form of a white powder.

The accompanying drawing shows works constructed on this principle.

A is a Scotch hearth, where the fumes are produced. From there they pass into the furnace B, which is heated by a flame of generator-gas, which burns out all the impurities contained in the incoming fumes, which it purifies, and the purified white-lead fumes then pass through the cooling-pipes C and are blown into the catching or screening apparatus D.

We prefer to use a generated gas-flame on account of its uniformity of composition and easy management.

This process works well in all cases except where we have to deal with waste fumes from smelting raw and unroasted sulphuret of lead. In this single case we find a great deal of sulphuric acid is produced, and the process does not work well, while the process described in a pending application of Geo. T. Lewis has to be used.

Having now described our improved process, what we claim, and desire to secure by Letters Patent, is—

The process of refining lead-fumes by passing the fumes over or into a second fire, and then cooling and catching the same, substantially as set forth.

In testimony of which invention we hereunto set our hands.

GEORGE T. LEWIS.
EAYRE O. BARTLETT.

Witnesses:
H. R. SHULTZ,
JAS. MILLIGAN, Jr.